United States Patent [19]

Kandzia

[11] Patent Number: 4,639,930
[45] Date of Patent: Jan. 27, 1987

[54] PORT FOR GRAPHITIZATION FURNACE

[75] Inventor: Ulrich Kandzia, Bad Soden, Fed. Rep. of Germany

[73] Assignee: Sigri GmbH, Meitingen, Fed. Rep. of Germany

[21] Appl. No.: 698,930

[22] Filed: Feb. 7, 1985

[30] Foreign Application Priority Data

Feb. 8, 1984 [DE] Fed. Rep. of Germany ....... 3404322

[51] Int. Cl.$^4$ .............................................. H05B 3/00
[52] U.S. Cl. .................................... 373/120; 373/125
[58] Field of Search .............................. 373/120–126; 423/448, 460; 339/252 R, 253 R

[56] References Cited

U.S. PATENT DOCUMENTS

| 1,198,616 | 9/1916 | Brown | 373/122 |
| 3,989,883 | 11/1976 | Wiebke | 373/120 |
| 4,015,068 | 3/1977 | Vohler | 373/120 |
| 4,017,673 | 4/1977 | Michels | 373/120 |

Primary Examiner—Roy N. Envall, Jr.
Attorney, Agent, or Firm—Herbert L. Lerner; Laurence A. Greenberg

[57] ABSTRACT

Port for a longitudinal or Castner-type graphitizing furnace, the masonry of which consists of a bottom section, lateral blocks and a yoke. The electrode rests on the bottom section and is pressed by the superimposed yoke against the bottom section. The lateral blocks are clamped to the electrode. Horizontal or vertical gaps cannot develop between the electrode and the masonry of the port in the operation of the graphitizing furnace.

14 Claims, 3 Drawing Figures

PORT FOR GRAPHITIZATION FURNACE

BACKGROUND OF THE INVENTION

1. Field of the Invention

The invention relates to an end port for a graphitizing furnace, especially for a Castner-type type or longitudinal graphitizing furnace, of refractory masonry and at least one electrode set into the masonry.

2. Description of the Prior Art

Furnaces for graphitizing carbon products consist in general of a rectangular furnace bed lined with granular refractory materials, ports at the end faces into which the graphite electrodes are set, and movable side walls. In the Acheson-type graphitizing furnace, the material to be graphitized is alternatingly stacked with layers of a granular resistance compound between the ports, and the stack is surrounded by a granular insulating compound. The heating to the graphitizing temperature of about 3000 K. is accomplished by resistance heating, the electric current being fed to the graphite electrodes in the ports via bus bars. With increasing temperature the charge material initially expands uniformly, but with the beginning emission of the sulfur contained in the carbon expands abruptly, and with an increasing degree of crystalline ordering or graphitizing, the volume of the charged material decreases. All volume changes are then taken up essentially by the granular resistance material, the packing density of which changes accordingly, so that no major forces act upon the graphite electrodes connected to the masonry of the ports in a positively force-transmitting manner. However, the formation of gaps between the masonry and the electrode does frequently occur, particularly because of the different coefficients of thermal expansion of these materials. Acheson-type graphitizing furnaces are rugged and prone to little disturbance; disadvantages are, among other things, the low energy efficiency and the low productivity per unit area. The graphitizing furnace initially proposed by Castner, which is often called a longitudinal graphitizing furnace, does not have these disadvantages. In a Castner furnace, the material to be graphitized, for instance in the form of cylindrical carbon bodies, is clamped between the graphite electrodes of the port without the interposition of layers of granular resistance material. At least one electrode is movable in the direction of the longitudinal axis of the furnace and, for obtaining a low contact resistance, the electrode is pressed against a strand formed by the carbon bodies to be graphitized braced against the counterelectrode. The length change of the strand in the graphitizing process varies; in the heating-up phase it is about +0.5 to 2% and in the cooling-down phase of the furnace, about −2 to 1.5% is taken up by a displacement of the electrodes in the opposite sense in the direction of the longitudinal oven axis. In order to have mobility of the electrode relative to the masonry of the oven head, it is necessary to have some clearance between the electrode and the masonry. Oxygen in the air penetrating into the gap between the electrode and the masonry reacts with carbon, and a wide gap could permit sufficient air to penetrate and cause the graphite electrode to burn up. It is also impossible fundamentally to adjust a constant small gap width over the entire temperature range because of the different coefficients of thermal expansion of the graphite electrode and the ceramic masonry. Attempts to design the gaps with stuffing gland-like seals and mineral fiber packings were not satisfactory since seals of this type are of only limited stability under the conditions of graphitizing. With increasing wear of the packing, the granular insulating material which shields the material to be graphitized against air, penetrates increasingly into the seal, whereby permanent gaps are formed and the inflow of air increases.

SUMMARY OF THE INVENTION

An object of the invention is to prevent air oxygen attacking the graphite electrodes in ports of graphitizing ovens and to increase the useful life of the electrodes.

With the foregoing and other objects in view, there is provided in accordance with the invention a port for a graphitizing furnace, particularly for a longitudinal graphitizing oven, comprising refractory masonry and an electrode set into the masonry, said masonry formed of a bottom section, lateral blocks and a yoke, said electrode resting on the bottom section and the yoke resting on the electrode, and a clamping device comprising a tierod, a lever and a spring clamping the lateral blocks to the electrode.

Other features which are considered as characteristic for the invention are set forth in the appended claims.

Although the invention is illustrated and described herein as embodied in a port for graphitizing furnace, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DESCRIPTION OF THE PREFERRED EMBODIMENTS

Figure 1:
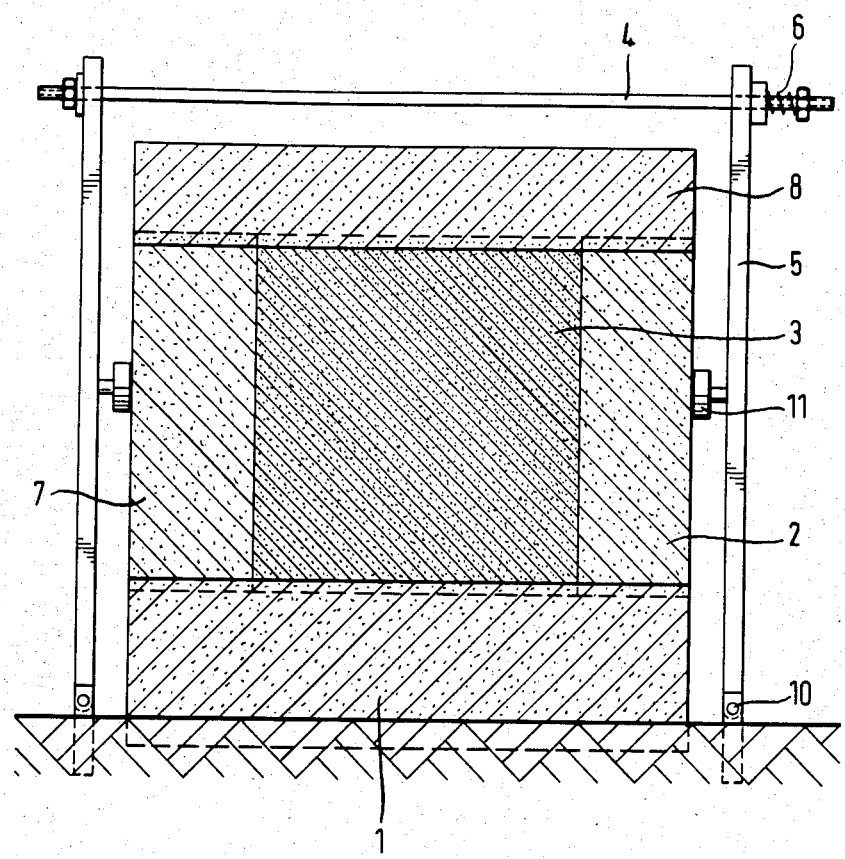
FIG. 1 shows a section of a port perpendicular to the longitudinal axis of the graphitizing furnace, FIG. 2 diagrammatically illustrates another embodiment of the invention.

In accordance with the invention, the problem of preventing attack of the graphite electrode in a port by air oxygen is solved with an end port of the type mentioned at the outset, the masonry part of which is formed by a bottom section 1, lateral blocks 2, 7 and a yoke 8. The electrode 3 rests on the bottom section 1 and the yoke 8 on the electrode 3. The lateral blocks 2, 7 are clamped to the electrode 3 by a tightening device comprising a tierod 4, a lever 5 and a spring 6.

In the port according to the invention, the surfaces of the electrode extending parallel to the longitudinal axis of the oven are under pressure contact with the masonry during the entire graphitizing run, the contact pressure between the bottom section and the electrode being determined by the weight of the electrode and the yoke pressing on the bottom section, between the electrode and the yoke by the yoke weight pressing on the top surface of the electrode, and between the electrode and the lateral blocks by the pretension of the spring 6. The electrode is pressed with constant force against the carbon body to be graphitized by a pressure device arranged outside the graphitizing furnace as is conventional. The electrode follows the length changes of the carbonizing bodies during their conversion into graphite and accordingly the electrode changes its position relative to the masonry by this amount. In order to reduce the friction forces in the relative motion of the electrode and the masonry sections, ground or polished graphite sheets or plates are inserted between the contact surfaces. Advantageously, these plates are cemented, pinned or connected in another manner, to the bottom section. The lateral blocks and the yoke part of the masonry may be held in a form-locking way, so that the plates do not follow the axial motion of the electrode. Intermediate plates of graphite prevent, at least to a large extent, the erosive wear of the moving graphite electrode.

In a preferred embodiment of the invention, the lateral block 2 is connected, for instance, by pins or a dove-tail joint to the bottom section 1. The electrode 3 is clamped by the clamping device between the lateral block 7 and the lateral block 2. The block 7 is movable relative to the bottom section 1, and the block 7 presses against the electrode 3 which in turn presses against the lateral block 2. Axial movements of the yoke 8 are advantageously prevented by forced guidance in the lateral blocks 2, 7, by means of for instance, prismatic or slot and key guides. A corresponding guide of the lateral block 7 in the bottom section is also advantageous.

The invention will be described in the following by way of example.

Referring to FIG. 1, the electrode 3 rests on the bottom section of the port set into the floor of the graphitizing room and presses with its weight onto its substrate. The yoke 8 rests freely on the electrode 3, pressing against it. During graphitization, the freely resting yoke 8 is lifted by the expanding electrode and also follows the motion of the electrode 3 when the electrode 3 shrinks during the cooling-down phase. The formation of horizontal gaps between the electrode 3 and the bottom section 1, and the electrode 3 and the yoke 8, is accordingly minimized or eliminated. The lateral blocks 2, 7 are disposed at the side surfaces of the electrode 3. Blocks 2, 7 are pressed against the electrode 3 by a clamping device, thereby also preventing vertical gaps being formed during the graphitizing process. The clamping device contains a tierod 4, lever 5 rotatable about fulcrums 10, pressure discs 11 and compression springs 6. The pressure generating apparatus for moving the electrode, the current leads and the cooling device are not shown in the drawing, as this is conventional equipment known in the art.

Figure 2:
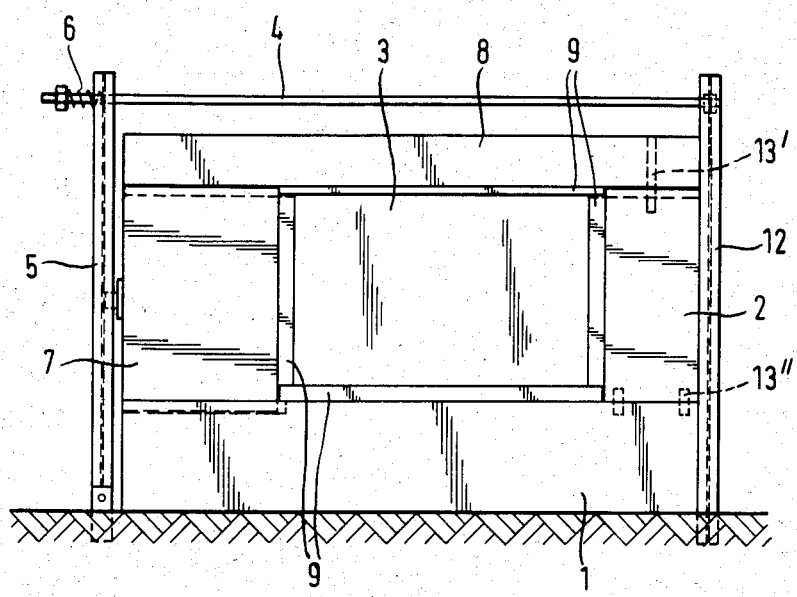
Figure 3:
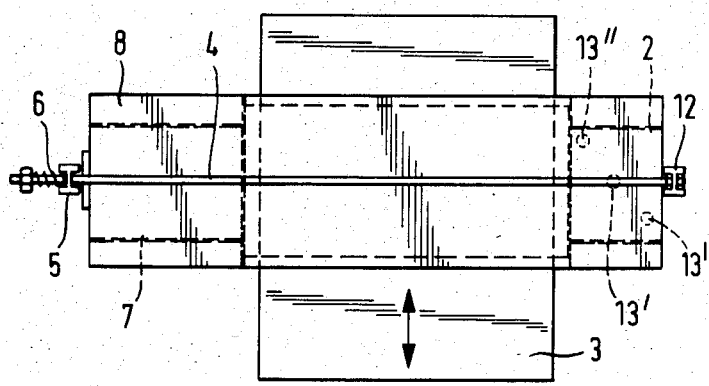
FIG. 3 is a side elevation of the port according to FIG. 2.

In the embodiment according to FIGS. 2 and 3, the clamping device is braced against the abutment 12. The pins 13' and 13" between the lateral blocks 2 and the bottom section 1 or the yoke 8, connect these masonry parts in a positive force transmitting manner in which relative horizontal motions are not possible, but vertical motions are not restricted. In this embodiment, the guidance of the lateral block 2 is particularly simple. Ground graphite plates 9 are inserted between the masonry parts 1, 2, 7, 8 and the electrode 3 for lowering the friction forces between the masonry parts of the port and the electrode which moves in the axial direction.

There is claimed:

1. Port for a graphitizing furnace, particularly for a longitudinal graphitizing oven, comprising refractory masonry and an electrode set into the masonry, said masonry formed of a bottom section, lateral blocks and a yoke, said electrode resting on the bottom section and the yoke resting on the electrode, and a clamping device comprising a tierod, a lever and a spring clamping the lateral blocks to the electrode.

2. Port according to claim 1, including graphite plates which are inserted between the bottom section, the lateral blocks, the yoke and the electrode.

3. Port according to claim 2, wherein the graphite plates are connected in a positively force-transmitting manner to the bottom section, the lateral blocks and the yoke.

4. Port according to claim 1, wherein one of said lateral blocks, designated first lateral block, is connected in a positively force-transmitting manner to the bottom section, and the other of said lateral blocks, designated second lateral block, is clamped to the electrode by the clamping device and is pressed against said first lateral block.

5. Port according to claim 2, wherein one of said lateral blocks, designated first lateral block, is connected in a positively force-transmitting manner to the bottom section, and the other of said lateral blocks, designated second lateral block, is clamped to the electrode by the clamping device and is pressed against said first lateral block.

6. Port according to claim 3, wherein one of said lateral blocks, designated first lateral block, is connected in a positively force-transmitting manner to the bottom section, and the other of said lateral blocks, designated second lateral block, is clamped to the electrode by the clamping device and is pressed against said first lateral block.

7. Port according to claim 1, including guide means for guiding the yoke in the lateral blocks to prevent axial movement of the yoke.

8. Port according to claim 2, including guide means for guiding the yoke in the lateral blocks to prevent axial movement of the yoke.

9. Port according to claim 3, including guide means for guiding the yoke in the lateral blocks to prevent axial movement of the yoke.

10. Port according to claim 4, including guide means for guiding the yoke in the lateral blocks to prevent axial movement of the yoke.

11. Port according to claim 4, including means for guiding said second lateral block in the bottom section to prevent axial movement of said second lateral block.

12. Port according to claim 5, including means for guiding said second lateral block in the bottom section to prevent axial movement of said second lateral block.

13. Port according to claim 6, including means for guiding said second lateral block in the bottom section to prevent axial movement of said second lateral block.

14. Port according to claim 7, including means for guiding said second lateral block in the bottom section to prevent axial movement of said second lateral block.

* * * * *